Patented Mar. 6, 1945

2,370,900

UNITED STATES PATENT OFFICE 2,370,900

TETRAHYDRO TRIHYDROXY-ABIETIC ACID

Alfred Winterstein, Basel, Switzerland, assignor to Hoffmann-La Roche Inc., Nutley, N. J., a corporation of New Jersey No Drawing. Application August 26, 1942, Serial No. 456,291. In Switzerland December 3, 1941

6 Claims. (Cl. 260—100)

It has been found that the hitherto unknown tetrahydro trihydroxy-abietic acid exerts a strongly cholagogic action.

For the purpose of preparing tetrahydro trihydroxy-abietic acid, abietic acid is first treated with an oxidising agent (Helvetica Chimica Acta, volume 21, year 1938, page 573). Thereby, a labile compound is formed among various other products, probably an oxido-dihydroxy-abietic acid. By treating this compound with halogen hydracide, a monohalogeno-trihydroxy-abietic acid is obtained. As a result of the action of reducing reagents, the halogen is exchanged for hydrogen, whereby tetrahydro trihydroxy-abietic acid is isolated in good yield.

Tetrahydro trihydroxy-abietic acid melts at 130° C. The colour reaction with concentrated sulfuric acid is characteristic. Whereas most derivatives of abietic acid show a red coloration at once, tetrahydro trihydroxy-abietic acid gives a green coloration first, which only in the course of some time turns red. Tetrahydro trihydroxy-abietic acid can easily be dissolved with alkalis; the solution is stable to heat and is suitable for parenteral administration of the compound. Already in doses of 10 mg. per kilogram of animal, tetrahydro trihydroxy-abietic acid causes a considerable increase in the secretion of bile. The following effects were observed in rabbits:

| Dose in mg. | Bile secretion in c. c. per 30 minutes | | Increase in— | |
|---|---|---|---|---|
| | Before | After | C. c. | Per cent |
| 10 | 5 5 | 7 8 | 2 3 | 42 |
| 10 | 5 6 | 7 9 | 2 3 | 41 |
| 10 | 3 1 | 6 4 | 3 3 | 106 |
| 10 | 4 7 | 6 4 | 1 7 | 36 |
| 10 | 3 9 | 6 0 | 2 1 | 54 |
| Average increase of the bile secretion | | | | 56 |

Tetrahydro trihydroxy-abietic acid is to be used as medicinal preparation.

Example 1

10 parts by weight of bromo-trihydroxy-abietic acid are reacted with 100 parts by weight of glacial acetic acid and turned into a solution by heating to 75° C. 20 parts by weight of zinc dust are added and the temperature kept at 75–80° C. for 4 to 6 hours while stirring well. By the addition of a small quantity of platinum chloride, the reaction can be accelerated. After cooling, the product is sucked off, the zinc washed with a little glacial acetic acid and the glacial acetic acid solution poured into 10 times the quantity of water. The tetrahydro trihydroxy abietic acid separates as a resinous mass which solidifies in crystalline form after some time. For the purpose purification, the product is recrystallised from methanol or benzene.

Example 2

43.3 parts by weight of bromo-trihydroxy-abietic acid are dissolved in 500 parts by weight of glacial acetic acid by heating. 6 parts by weight of anhydrous potassium acetate as well as 2 parts by weight of a palladium catalyst are added. The whole is now shaken in a hydrogenation autoclave in presence of hydrogen, whereby there is to be a temperature of about 70° C. and a gauge pressure of about 30 atm. The replacement of the halogen by hydrogen occurs in a short time. After separation of the catalyst, the glacial acetic acid is evaporated to a small volme in vauco, poured into 10 times the quantity of water and the resulting product recrystallised from a mixture of 1 part by weight of alcohol plus 9 parts by weight of benzene.

I claim:

1. Tetrahydro trihydroxy-abietic acid.
2. Process for the manufacture of tetrahydro trihydroxy-abietic acid, comprising causing reducing agents capable of replacing halogen by hydrogen to act on a halogen-trihydroxy-abietic acid.
3. Process for the manufacture of tetrahydro trihydroxy-abietic acid, comprising causing reducing agents capable of replacing halogen by hydrogen to act on a halogen-trihydroxy-abietic acid in presence of a catalyst.
4. Process for the manufacture of tetrahydro trihydroxy-abietic acid, comprising causing reducing agents capable of replacing halogen by hydrogen to act on bromo-trihydroxy-abietic acid in presence of a catalyst.
5. Process for the manufacture of tetrahydro trihydroxy-abietic acid, comprising causing hydrogen to act on bromo-trihydroxy-abietic acid in presence of a catalyst.
6. Process for the manufacture of tetrahydro trihydroxy-abietic acid, comprising causing hydrogen to act on halogen-trihydroxy-abietic acid in presence of a catalyst.

ALFRED WINTERSTEIN.